UNITED STATES PATENT OFFICE.

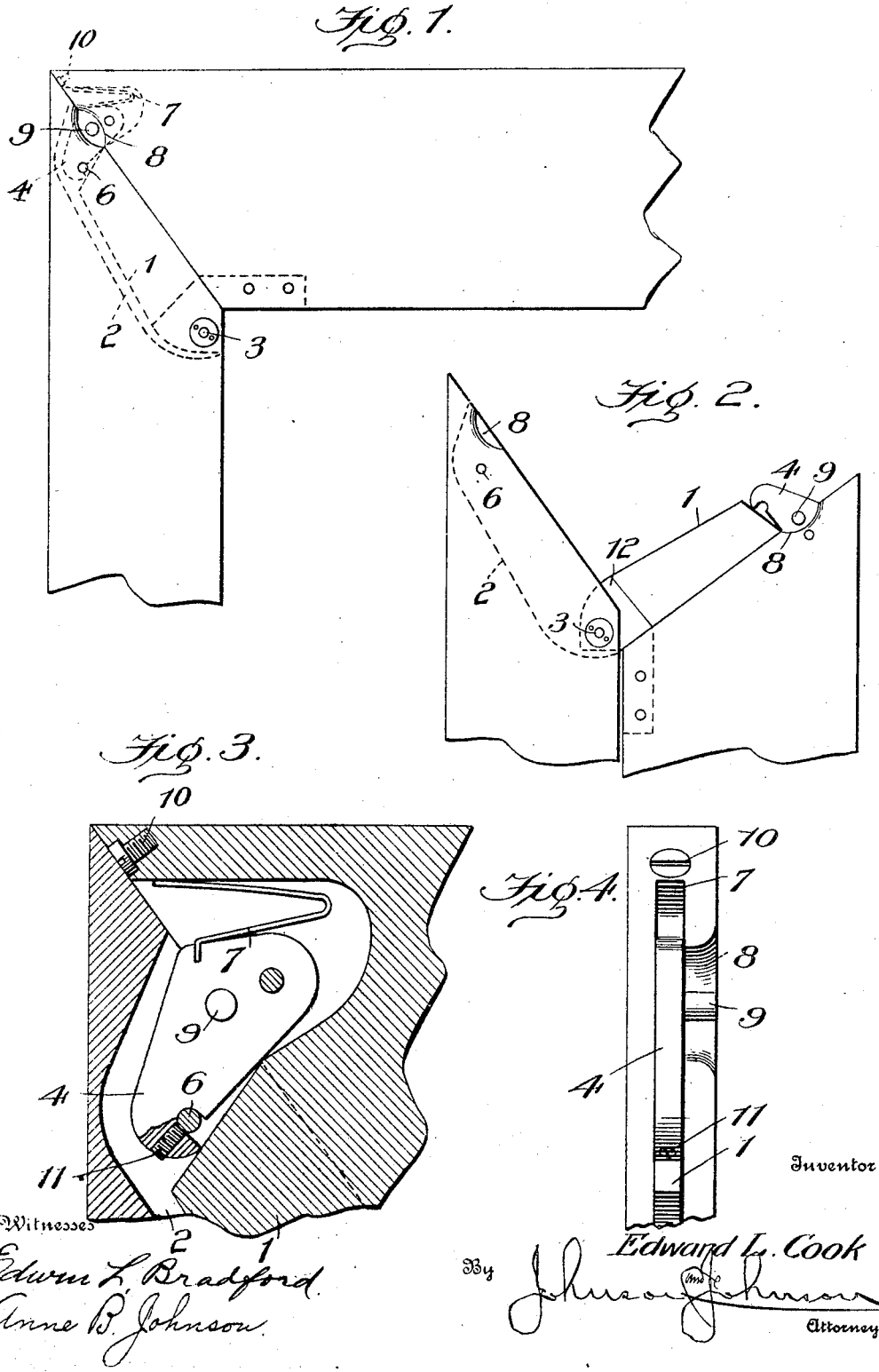

EDWARD L. COOK, OF BRATTLEBORO, VERMONT.

FOLDING SQUARE.

No. 810,188.  Specification of Letters Patent.  Patented Jan. 16, 1906.

Application filed September 11, 1905. Serial No. 278,011.

*To all whom it may concern:*

Be it known that I, EDWARD L. COOK, a citizen of the United States, residing at Brattleboro, in the county of Windham and State of Vermont, have invented certain new and useful Improvements in Folding Squares; and I do hereby declare the following to be a full, clear, and exact description of the invention, such as will enable others skilled in the art to which it appertains to make and use the same.

In folding squares the joint at the pivot connection is liable to become open by strain in using the square, and by wear of the pivot the members become out of true square and the joint connection loses its firmness. My improvement provides for taking up any looseness and for compensating for any separation of the joint caused by wear or strain, keeping the joint firm and the square true with its convenience for folding. For this purpose I provide a construction of miter-joint at the angle and in which the members are secured together by a catch, and an adjusting-screw is set at the apex of the joint, whereby the screw is so adjusted as to compensate for any opening or looseness of the joint at the pivot connection. Coöperating with this joint-adjusting screw I provide the hook end of the catch with an adjusting-screw arranged to engage a pin to take up any wear of the pin or of the catch which engages the pin, and thus if the joint should become open keep the square members firm at the true angle.

Referring to the accompanying drawings, Figure 1 shows a portion of a folding square having a miter-joint, the fastening-catch being shown in dotted lines. Fig. 2 shows the same with the square members folded. Fig. 3 is an enlarged view showing the catch, the adjusting-screw in its hook end, and the adjusting-screw at the apex of the joint. Fig. 4 is an edge view of the same.

The members of the square are pivoted together by means of a tongue 1, projecting from the miter edge of one member and entering a groove 2 in the miter edge of the other member, the pivot 3 forming the joint in the tongue at the side of the inner angle to allow the members to be folded. It will be noticed that the miter-joint forms a long bearing, gives the advantage of a long tongue, and the pivoting of a catch 4 within and so as to cross the joint allows the hook end of the catch to be spring-pressed upon the edge of the tongue, thereby holding the catch in position to automatically engage a pin 6, fixed in the other member of the square, the catch for this purpose entering the groove 2, with the tongue inclosing the members of the square. A spring 7, inclosed in the joint, constantly maintains the catch pressed upon the edge of the tongue. A recess 8 is made on one side of the square where the catch crosses the joint, and a thumb-knob 9 projects from the catch in this recess, by which the catch is disengaged from its fastening-pin when it is desired to fold the square. At the apex of the joint a screw 10 is set with its head countersunk flush with the joint, and by unscrewing it will cause the head to be projected into the joint, and thus prevent the joint from being closed; but this is only done when from straining or other cause the joint at its pivot connection is slightly opened or becomes loose, and in such case it is the function of the screw to cause the joint to stand equally open at its apex, and thereby maintain the square members at the true angle. To allow this screw-head to form an abutment in the joint without interfering with the proper function of the catch, I provide its hook end with a screw 11, set so that its end will enter the engaging side or neck of the hook and engage the fastening-pin and in this way take up wear and render the hook effective in keeping the joint firm whether the joint be closed or slightly open from the causes stated.

The joint-pivot is fixed in a plate 12, riveted to a member of the square, and forms an extension of the tongue. The adjusting-screws are independent of each other in their functions, so that if there is no necessity to adjust the apex joint-screw the hook-screw can be adjusted to give a firm and tight engagement of the catch on the fastening-pin.

I claim—

1. In a folding square, the members pivoted together with a miter-joint, a tongue on one member entering a groove in the other member, a catch pivoted at the apex of the joint, a spring keeping the hook end of the catch pressed upon the edge of the tongue, and a pin with which the catch is automatically caused to engage in closing the members.

2. In a folding square, the members pivoted together with a miter-joint, a spring-pressed catch pivoted at the apex of the joint on one member, a pin on the other member for the engagement by the catch, and an adjusting-screw in one member with its head within the joint at its apex for the purpose stated.

3. In a folding square, the members pivoted together with a miter-joint, a spring-pressed catch having a hook end pivoted at the apex of the joint on one member, a pin on the other member for engagement by the catch, and an adjusting-screw in the hook end of the catch for the purpose stated.

4. In a folding square, the members pivoted together with a miter-joint, a spring-pressed catch having a hook end pivoted at the apex of the joint on one member, a pin on the other member for engagement by the catch, an adjusting-screw in one member with its head within the joint at its apex, and an adjusting-screw in the hook end of the catch substantially as described for the purpose specified.

In testimony whereof I have signed my name to this specification in the presence of two subscribing witnesses.

EDWARD L. COOK.

Witnesses:
HARRY C. FREEMAN,
JULIUS E. LEACH.